United States Patent [19]

Stoller

[11] 4,170,842
[45] Oct. 16, 1979

[54] SYNTHETIC CASING FOR MUSHROOM BEDS

[76] Inventor: Benjamin B. Stoller, P.O. Box 1339, Santa Cruz, Calif. 95060

[21] Appl. No.: 917,937

[22] Filed: Jun. 22, 1978

Related U.S. Application Data

[63] Continuation-in-part of Ser. No. 830,011, Sep. 1, 1977, abandoned.

[51] Int. Cl.² .............................................. A01G 1/04
[52] U.S. Cl. ........................................... 47/1.1; 71/5
[58] Field of Search ................................. 47/1.1; 71/5

[56] References Cited

U.S. PATENT DOCUMENTS

| 3,828,470 | 8/1974 | Stoller | 47/1.1 |
| 4,079,543 | 3/1978 | Stoller | 47/1.1 |

FOREIGN PATENT DOCUMENTS 46-9205  3/1971  Japan .......................... 47/1.1

*Primary Examiner*—Robert E. Bagwill
*Attorney, Agent, or Firm*—Robert G. Slick

[57] ABSTRACT

A synthetic casing for mushroom beds is provided by a formulation consisting of a water absorptive material selected from paper plant waste, spent mushroom compost and cottonseed hulls; the water absorptive material is mixed with activated carbon, water and limestone.

7 Claims, No Drawings

SYNTHETIC CASING FOR MUSHROOM BEDS

REFERENCE TO RELATED APPLICATIONS

This application is a continuation-in-part of my application Ser. No. 830,011 filed Sept. 1, 1977 (now abandoned).

SUMMARY OF THE PRIOR ART

The best known prior art is applicant's copending patent application Ser. No. 783,667 (now U.S. Pat. No. 4,079,543) wherein shredded newspaper is employed as the water absorptive material. The present invention is an improvement thereover since the materials employed as water absorptive materials in accordance with the present invention are materials with very little market value and, in fact, frequently constitute a waste disposal problem. Accordingly, these materials which have no value or at most have a very low value have been successfully employed as mushroom casings which are capable of replacing shredded newspaper and the even more expensive peat.

SUMMARY OF THE INVENTION

In growing mushrooms it is a universal practice to "case" the beds by placing a layer of material over the mushroom bed after the spawn has permeated the compost. This casing layer is usually one to two inches thick, and originally was loam soil. In 1947 I discovered that peat could be substituted for this loam soil. I described by experiments and commercial practice in my articles, "Studies on the Function of the Casing for Mushroom Beds," Part I, Part II and Part III in the October 1952, November 1952 and December 1952 issues of the Mushroom Growers' Association Bulletin, published in London, England. Other materials such as vermiculite, gravel, crushed brick and ashes have also been proposed.

The purpose or function of the casing material is to provide a medium which is insufficient in nutrients so that the mycelium growing into the casing is unable to form the polyphenol oxidase enzymes, which in turn produce the quinones that prevent fruiting. (The quinones are useful to the mushroom as a defensive mechanism, but must be destroyed in order to induce fruiting). The alkalinity and reducing substances occurring in the casing also serve to destroy these quinone inhibitors volatilizing into the casing. The casing also serves as an additional source of moisture. The reducing substance is preferably activated carbon.

At the present time peat is widely used for casing mushroom beds, but peat reserves suitable for casing mushroom beds are now being depleted. Also, the cost of baling and transporting peat is becoming expensive so that it would be highly desirable to provide a relatively inexpensive substitute for the peat.

Although various synthetic casings for mushroom beds have been proposed, none have produced the large yields to compete with peat, or have been too expensive to have any practical application. In the formulas for a synthetic casing to be presented, I have discovered how to make a practical formula for commercial practice and a formula which will produce yields even higher than those obtainable with peat.

In accordance with the present invention, an inexpensive material that is highly absorptive to water is combined with activated carbon to adsorb, remove or destroy emanations derived from mycelium that prevent fructification.

In addition, a casing material is provided which in some embodiments produces a much higher yield of mushrooms than can be obtained with conventional casing materials.

In accordance with the present invention an inexpensive material that is highly absorptive to water is combined with activated carbon to adsorb, remove or destroy emanations derived from mycelium that prevent fructification. These materials are of extremely low commercial value or even waste materials which form a disposal problem.

Accordingly, it is an object of the present invention to provide a casing material wherein the bulk of the material is made from an otherwise worthless, or at least low value, absorptive material.

Various other features and advantages of the invention will be brought out in the balance of the specification.

DESCRIPTION OF THE PREFERRED EMBODIMENTS

In accordance with the present invention, a material which is highly absorptive to water, preferably a fibrous material known as clarifiber, hereinafter defined, spent mushroom compost, or less preferably, cottonseed hulls. With any of these water absorptive materials, it is necessary to employ limestone and activated carbon. Since the clarifiber as delivered ordinarily contains from 40 to 50 percent by weight of water, it is ordinarily not necessary to add any water to the material. However, the material is ordinarily too compact as received and is preferably shredded before use. For each 600 grams of the moist clarifiber one may employ 12 to 30 grams of activated carbon and 300 to 600 grams of limestone. The limestone is preferably granular with the granules somewhat larger than ordinary granulated sugar. Larger particles up to approximately one-eighth in diameter may be employed.

The clarifiber is a sulfite pulp waste product defined as follows:

A cellulosic fibrous material known as "clarifiber," generated by Georgia-Pacific Operations, Bellingham, Washington, and by other paper-making companies in the manufacture of sulfite pulp, is a waste product usually disposed of by burning. The major components of the "clarifiber" are as follows:

Pulp fiber (46% softwood sulfite, 32% chem-mechanical and 22% softwood kraft)

Sulfite screenings (partially digested wood and bark).

The minor components are as follows:

Sand, small rocks and shell pieces.

As this cellulosic fibrous material leaves the paper-producing plant for shipment, it contains 40% to 50% by weight water, has a pH of 4.0 to 6.5, and has a shipping density of 33 lbs. per cubic foot.

Another material which is suitable for use in the present invention is the so-called "spent compost" which results from mushroom growing. This is compost on which a crop of mushrooms has been grown and is an unsuitable substrate by itself to use in growing another crop of mushrooms. Although this material is a valuable fertilizer, mushroom growers tend to congregate in relatively small areas so that in those areas where mushrooms are grown, there is a poor, if any, market for the spent compost. In the past, this spent compost has often been put out into fields and allowed to weather for a few years, whereupon it can be used as a casing material. The loss of material in this manner is considerable so that this method of disposal and reuse is not ordinarily satisfactory.

In accordance with the present invention, it has been found that the spent compost can be mixed with activated carbon, calcium carbonate, e.g. chalk or limestone, and water and used as a casing. This is another example of a fibrous material which has little or no value and which can replace the costly peat as a casing material. Preferably, the spent compost is washed with water to remove soluble salts but this is not necessary in all instances. Also, the spent compost is preferably sterilized either by heat or with a chemical agent such as propylene oxide, if dried, or as a preventive measure in an old crop house.

Another cellulosic fibrous material which may be used is cottonseed hulls which are a by-product of pressing cottonseed oil. This material is less preferable than the clarifiber mentioned above since the hulls are frequently infested with insects, mites and nematodes and they may additionally contain mold spores. Accordingly, to make this material suitable for use as a synthetic casing, it must be fumigated or sterilized with steam or propylene oxide. Good results were obtained by fumigating with propylene oxide at the rate of 10 milliliters of propylene oxide per 1 lb of cottonseed hulls. Heating for 24 hours at 140 degrees F. was also useful for destroying pests, but was not quite as satisfactory as fumigating.

Since the cottonseed hulls are dry, water must be added preferably so that the wet hulls have a water content of 40 to 50 percent by weight. The amount of carbon and limestone can be the same as with the clarifiber.

The following working examples illustrate preferred embodiments of the invention:

To conduct tests with these materials, mushrooms were grown as follows: spawned compost was filled in approximately 5 gallon plastic pails, 10 inches deep, and having a surface area of approximately ¼ square foot. The synthetic casing was applied in a layer one inch to two inches deep. The mushrooms were both the brown and cream strain types and were picked for 15 days to determine the yield. The following casing formulations were employed and the yield shown in pounds per pail, calculated on basis of pounds per square foot, of cut mushrooms.

1.
   Shredded clarifiber—600 grams
   Granulated limestone—400 grams
   Activated carbon (Darco-S-51)—20 grams
   pH of mixture 7.5 Yield—5 to 6 lbs. per sq. ft.

2.
   Shredded clarifiber—600 grams
   Large particle limestone (approx. ⅛" diam.)—500 grams
   Activated carbon (Darco-S-51)—20 grams
   pH of mixture 7.5 Yield 5 to 6 lbs. per sq. ft.

3.
   Sterilized cottonseed hulls—400 grams
   Granular limestone—500 grams
   Water—600 milliliters
   Activated carbon (Darco-S-51)—20 grams
   Yield 4 to 5 lbs. per sq. ft.
   pH of mixture 7.5

4.
   Dried spent compost—300 grams
   Activated carbon—30 grams
   Granulated chalk—500 grams
   Water—500 milliliters
   pH of mixture—7.5
   Yield—5.3 lbs. per sq. foot.

5.
   "Spent" compost from mushroom bed or tray was heated to approximately 140° F. for 12 hours and then fumigated with formaldehyde (the usual practice in emptying an old crop before refilling).

The casing layer was then stripped off.

The spent compost was washed and mixed with water at the rate of 4 lbs. water to one lb. of "spent" compost, in a paddle mixer or other type of mixer.

The mixing in water was continued for approximately 2 minutes, using caution not to overmix and destroy the fibrous structure of compost.

The compost was decanted and emptied on a screen, followed by draining off excess water on screen, pressing out excess water, and refilling washed compost into mixer.

To 1200 grams of wet spent compost, add in mixer:
   Granulated chalk—500 grams
   Activated carbon—30 grams
   pH 7.5
   Yield—1.9 lbs. per sq. ft. in first break—6 days pick.

(This experiment was conducted in trays, 4×4 feet square, at Ariel Mushroom Farm. Average yield for 11 control trays for first week was 1.2 lbs. per sq. ft. Average yield for non-washed compost to which activated carbon and limestone were added same as to washed compost, yield 1.2 lbs. per sq. ft.)

I claim:

1. A casing material for mushrooms beds comprising a moist absorptive material selected from the group consisting of clarifiber, which is a cellulosic fibrous material generated in the manufacture of sulfite pulp and consisting principally of pulp fiber and partially digested wood and bark, spent compost and ground cottonseed hulls, said absorptive material being mixed with activated carbon and ground limestone wherein the amount of moisture, based on the amount of absorptive material, is from about 40% to 50% by weight.

2. The casing material of claim 1 wherein the amount of limestone is from about 50% to 100% by weight and the amount of activated carbon is from 2% to 5% by weight, the amounts of limestone and carbon being based on the weight of the moist material.

3. The casing material of claim 1 having the following composition
   Shredded clarifiber: 600 grams
   Granulated limestone: 400 grams
   Activated carbon: 20 grams
   pH 7.5.

4. The casing material of claim 1 having the following composition:
   Sterilized cottonseed hulls: 400 grams
   Granular limestone: 500 grams
   Water: 600 ml
   Activated carbon: 20 grams
   pH 7.5.

5. The casing material of claim 1 having the following composition:
   Dried spent mushroom compost: 300 grams
   Granulated chalk: 500 grams
   Activated carbon: 30 grams
   Water: 500 ml
   pH 7.5.

6. The casing material of claim 1 wherein the spent compost is washed with water to remove soluble salts prior to use as a casing material.

7. The casing material of claim 1 having the following composition:

Wet spent compost: 1200 grams
Granulated chalk: 500 grams
Activated carbon: 30 grams
pH 7.5.

* * * * *